No. 775,809.

Patented November 22, 1904.

UNITED STATES PATENT OFFICE.

MAX ENGELMANN, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF PREPARING DIALKYLBARBITURIC ACID.

SPECIFICATION forming part of Letters Patent No. 775,809, dated November 22, 1904.

Application filed August 4, 1904. Serial No. 219,505. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD Co., of New York,) have invented a new and useful Improvement in New Processes of Preparing Dialkylbarbituric Acids; and I do hereby declare the following to be an exact and clear description of my invention.

My invention relates to a new process for the production of dialkyl-barbituric acids (dialkyl-2-4-6-trioxypyrimidins) having the following general formula:

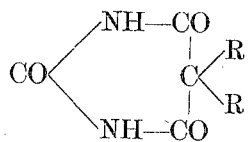

(R meaning alkyl radicals,) which bodies possess valuable therapeutic, especially soporific, properties. The process for the preparation of these compounds consists in first desulfurizing the 2-thio-4-6-diimino-5-dialkylpyrimidins having the formula

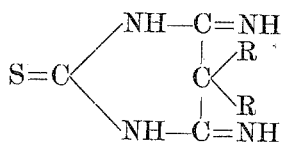

by treatment with oxidizing agents, by which operation the sulfur is replaced by oxygen and then splitting of the imino groups and replacing them by oxygen in 4 and 6 position from the resulting 2-oxy-4-6-diimino-5-dialkyl-pyrimidins by treatment with saponifying agents.

In order to carry out my process practically, I can, for instance, proceed as follows: Fifty parts of 2-thio-4-6-diimino-5-diethylpyrimidin, obtainable by condensing diethylmalonitril with thio-urea by means of an alkaline condensing agent, are slowly introduced into one hundred parts of concentrated nitric acid. The reaction is at an end after a short time. The 2-oxy-4-6-diimino-5-diethylpyrimidin separates on cooling. It is filtered off, washed with cold water, and dried. For the saponification thirty parts of the product thus obtained are heated with sixty parts of a thirty-percent. sulfuric acid for four hours on the water-bath. After cooling the resulting 2-4-6-trioxy-5-diethylpyrimidin (diethylbarbituric acid) is filtered off and recrystallized from boiling water. The splitting off of sulfur and the saponification can also be carried out with other saponifying or other oxidizing agents.

The process proceeds in an analogous manner for the production of other dialkyl barbituric acids.

Having now described my invention and in what manner the same is to be performed, what I claim as new, and desire to secure by Letters Patent, is—

1. The process for the production of dialkyl-barbituric acids having the above-given general formula, which process consists in first desulfurizing the 2-thio-4-6-diimino-5-dialkyl-pyrimidins and secondly splitting off the imino groups in 4 and 6 position from the resulting 2-oxy-4-6-diimino-5-dialkylpyrimidins thus produced by treatment with saponifying agents, substantially as hereinbefore described.

2. The process for the production of diethyl-barbituric acid, which process consists in first desulfurizing the 2-thio-4-6-diimino-5-diethyl-pyrimidin by means of oxidizing agents and secondly splitting off the imino groups in 4 and 6 position from the resulting 2-oxy-4-6-diimino-5-diethylpyrimidin by treatment with saponifying agents, substantially as hereinbefore described.

3. The process for the production of diethyl-barbituric acid, which process consists in first desulfurizing the 2-thio-4-6-diimino-5-diethyl-pyrimidin by means of nitric acid and secondly splitting off the imino groups in 4 and 6 position from the resulting 2-oxy-4-6-diimino-5-diethylpyrimidin by treatment with hot sulfuric acid, substantially as hereinbefore described.

In testimony whereof I have signed my name in the presence of two subscribing witnesses.

MAX ENGELMANN.

Witnesses:
OTTO KÖNIG,
J. A. RITTERSHAUS.